United States Patent
Yoshida et al.

(10) Patent No.: US 7,999,055 B2
(45) Date of Patent: Aug. 16, 2011

(54) POLYCARBONATE RESIN AND METHOD FOR PRODUCING THE SAME

(75) Inventors: Shu Yoshida, Tokyo (JP); Toshiaki Yamada, Tokyo (JP)

(73) Assignee: Mitsubishi Gas Chemical Company, Inc, Tokyo (JP)

(*) Notice: Subject to any disclaimer, the term of this patent is extended or adjusted under 35 U.S.C. 154(b) by 35 days.

(21) Appl. No.: 12/598,311

(22) PCT Filed: May 19, 2008

(86) PCT No.: PCT/JP2008/059109
§ 371 (c)(1),
(2), (4) Date: Oct. 30, 2009

(87) PCT Pub. No.: WO2008/143205
PCT Pub. Date: Nov. 27, 2008

(65) Prior Publication Data
US 2010/0121018 A1    May 13, 2010

(30) Foreign Application Priority Data

May 21, 2007 (JP) ................................. 2007-134847
May 21, 2007 (JP) ................................. 2007-134848

(51) Int. Cl.
*C08G 63/02* (2006.01)
*C08G 64/00* (2006.01)

(52) U.S. Cl. ............... 528/190; 428/411.1; 428/412; 528/196; 528/198

(58) Field of Classification Search ............ 428/412; 528/196, 198
See application file for complete search history.

(56) References Cited

U.S. PATENT DOCUMENTS

| 6,355,768 | B1 * | 3/2002 | Fujimori et al. ............ 528/196 |
| 2009/0093583 | A1 * | 4/2009 | Kawato et al. ............ 524/502 |

FOREIGN PATENT DOCUMENTS

| JP | 2004-67990 | | 3/2004 |
| JP | 2005089634 | * | 4/2005 |
| JP | 2006-131789 | | 5/2006 |
| WO | 2005/101127 | | 10/2005 |
| WO | 2006/006731 | | 1/2006 |
| WO | 2007/116967 | | 10/2007 |

OTHER PUBLICATIONS

Patent Abstracts of Japan of JP 2006-131789 dated May 25, 2006.
Patent Abstracts of Japan of JP 2004-67990 dated Mar. 4, 2004.
Datebase CA [On line], Chemical Abstracts Service, Columbus, Ohio, Dec. 31, 1969, XP002579369, "Linear polyesters and polycarbonates from bis(4-hydroxyphenyl) deoxybenzoin and 1,1-bis(4-hydroxphenyl)-2-oxoacenaphthene", retrived from STN, Database assession On. 1969:525037 *abstract*, & Revue Roumainne De Chimie, 14(6), 773-9 CODEN: Prchax; ISSN:0035-3930, 1969.

* cited by examiner

*Primary Examiner* — Terressa M Boykin
(74) *Attorney, Agent, or Firm* — Ladas & Parry LLP

(57) ABSTRACT

The present invention can provide a polycarbonate resin containing a structural unit represented by the following formula (1).

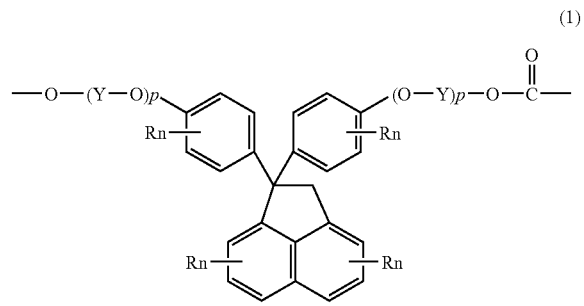

wherein R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; and n represents the number of substituting R's on a benzene ring and is an integer of 0 to 4. Y represents an alkylene group having 1 to 4 carbon atoms; and p is an integer of 0 to 4.

14 Claims, No Drawings

POLYCARBONATE RESIN AND METHOD FOR PRODUCING THE SAME

TECHNICAL FIELD

The present invention relates to a novel polycarbonate resin. In an especially preferable embodiment, the present invention relates to a novel polycarbonate resin having transparency, heat resistance, high refractive index, low photo-elastic coefficient, small birefringence, and high mechanical strength; and an optical material using the same. The polycarbonate resin according to the present invention is preferably usable as an optical material for plastic optical products including various types of optical lenses, prisms, optical disc substrates, optical fibers, optical communication devices and the like, and for optical films.

BACKGROUND ART

Recently, along with the development of optoelectronics, demands for transparent polymers for optical uses having optically superb isotropy are increasing. Especially, optical films having optical properties applicable for phase films of liquid crystal displays and the like are strongly desired. A polycarbonate resin obtained by reacting 2,2-bis(4-hydroxyphenyl)propane (generally referred to as "bisphenol A") with phosgene or carbonic acid diester, especially a polycarbonate film formed of such a polycarbonate resin, is used for packaging, optical devices, display devices and other industrial uses. Recently, such a polycarbonate film is a target of attention as a material of phase plates, polarization plates, plastic substrates and the like of optoelectronics devices such as liquid crystal displays, and are now progressively put into practice. Especially for TFT liquid crystal displays remarkably advancing today, among the liquid crystal displays highly developed recently, a polycarbonate film is a target of attention as a phase film used between the liquid crystal layer and the polarization plate in order to improve the visibility of images.

Such a phase film has a role of converting elliptical polarization transmitted through the liquid crystal layer into linear polarization, and is formed of a monoaxially stretched film of a polycarbonate resin mainly formed of bisphenol A.

When used as a phase film, a film obtained by molding a polycarbonate resin formed of bisphenol A has a high photoelastic coefficient because of the optical anisotropy of the benzene ring of the polycarbonate resin, which causes a problem that the phase difference variance is large due to the low stretching ratio. In addition, a film in a liquid crystal display needs to be treated at a high temperature of 180° C. or higher during the process of forming an alignment film or the like. The above-described film has a problem of not having a sufficient heat resistance.

As a polycarbonate resin having a high heat resistance and a low photo-elastic coefficient, a polycarbonate resin having a specific fluorene structure has been proposed (see, for example, Japanese Laid-Open Patent Publication No. 6-25398 (Patent Document 1), Japanese Laid-Open Patent Publication No. 2001-253960 (Patent Document 2)).

Although having a high heat resistance and a low photo-elastic coefficient, a polycarbonate resin having such a structure may be ruptured when the film is stretched or coiled and may be weak against folding. A polycarbonate film weak against folding does not provide a smooth cutting face when being cut after coiled, and is not sufficiently strong and so may be ruptured when being stretched. Improvements on these points are desired.

A conventional aromatic polycarbonate resin has a problem that the high photo-elastic coefficient and the low fluidity thereof cause a large birefringence as a result of molecule alignment at the time of molding and residual stress. Therefore, for molding an optical material formed of such a conventional aromatic polycarbonate resin, a resin having a relatively low molecular weight is used in order to improve the fluidity, and the resin is molded at a high temperature in order to reduce the birefringence of the product formed using such a resin. However, with the conventional aromatic polycarbonate resin, there is a limit on the reduction of the birefringence even where the above-mentioned means is taken. Therefore, along with the recent spread of the fields in which optical materials are used, a material having a still lower photo-elastic coefficient and a still higher fluidity is strongly desired to be developed in a part of the optical material fields. For this purpose, attempts have been made to develop a resin having a small birefringence.

In the mean time, an optical material having a high refractive index realizes a lens element with a face having a small curvature, and so reduces the aberration of this face. This reduces the number of necessary lenses, the lens eccentricity sensitivity, and the lens thickness, and so reduces the size and weight of the lens system. In the field of lenses for glasses, the lens thickness can be reduced for the same power of glasses, which provides an advantage of improving the external appearance of the glasses.

As an optical resin having a high refractive index and a small birefringence, a totally aromatic polycarbonate resin copolymer using bisphenol A with a fluorene structure having a high polarization ratio in a side chain direction has been studied (see Japanese Laid-Open Patent Publication No. 6-25398 (Patent Document 1), Japanese Laid-Open Patent Publication No. 7-109342 (Patent Document 3)).

A homopolycarbonate resin of an etherdiol with a fluorene structure having a high polarization ratio in a side chain direction and a phenol skeleton in a straight chain direction, and a copolymer of such a homopolycarbonate resin and a bisphenol have been shown (see Japanese Laid-Open Patent Publication No. 10-101787 (Patent Document 4), Japanese Laid-Open Patent Publication No. 10-101786 (Patent Document 5)).

A copolymer of a bisphenol with a fluorene structure having a large polarization ratio in a side chain direction and tricyclodecane[5.2.1.0$^{2,6}$]dimethanol has been proposed (see Japanese Laid-Open Patent Publication No. 2000-169573 (Patent Document 6)).

As described above, various types of materials having a small birefringence have been developed. Nonetheless, these technologies have problems that the refractive index is low, the moldability and the heat resistance are insufficient to provide a satisfying product, and the materials are colored.

Acenaphthene bisphenol, which is a monomer, is known and is used only as a resist composition. A resin having such a skeleton or properties thereof are not known at all, and there is no example in which such a resin is used for a specific use (see Japanese Laid-Open Patent Publication No. 2005-326838 (Patent Document 7), Japanese Laid-Open Patent Publication No. 2005-346024 (Patent Document 8)).

Patent Document 1: Japanese Laid-Open Patent Publication No. 6-25398
Patent Document 2: Japanese Laid-Open Patent Publication No. 2001-253960
Patent Document 3: Japanese Laid-Open Patent Publication No. 7-109342
Patent Document 4: Japanese Laid-Open Patent Publication No. 10-101787

Patent Document 5: Japanese Laid-Open Patent Publication No. 10-101786

Patent Document 6: Japanese Laid-Open Patent Publication No. 2000-169573

Patent Document 7: Japanese Laid-Open Patent Publication No. 2005-326838

Patent Document 8: Japanese Laid-Open Patent Publication No. 2005-346024

DISCLOSURE OF THE INVENTION

The present invention made in light of such circumstances has an object of solving at least one of the above-described problems of the conventional art, and especially an object of providing a novel polycarbonate resin preferably usable for optical materials, having transparency, high refractive index, heat resistance, small birefringence, low photo-elastic coefficient, and high mechanical strength, a method for producing such a polycarbonate resin, and an optical material using such a polycarbonate resin.

As a result of accumulating active studies in order to solve the above-described problems, the present inventors found that a polycarbonate resin comprising a structural unit represented by the following formula (1) can improve at least one of the properties preferable for optical material uses, i.e., transparency, high refractive index, heat resistance, small birefringence, low photo-elastic coefficient, and high mechanical strength, and thus completed the present invention.

Namely, the above-described problems can be solved by the present invention as follows.

<1> One embodiment of the present invention is directed to a polycarbonate resin, comprising a structural unit represented by the following formula (1).

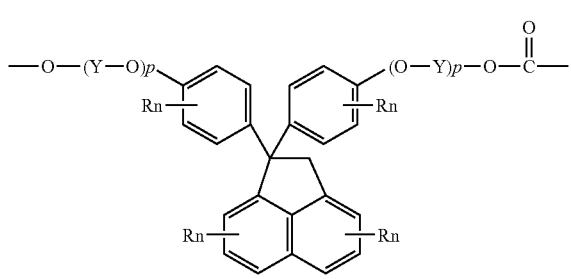

(1)

In the formula (1), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; and n represents the number of substituting R's on a benzene ring and is an integer of 0 to 4. Y represents an alkylene group having 1 to 4 carbon atoms; and p is an integer of 0 to 4.

<2> A preferable embodiment of the present invention is directed to the polycarbonate resin according to <1>, further comprising a structural unit represented by the following formula (2).

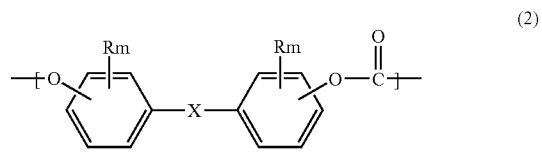

(2)

In the formula (2), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; and m represents the number of substituting R's on a benzene ring and is an integer of 0 to 4. X is

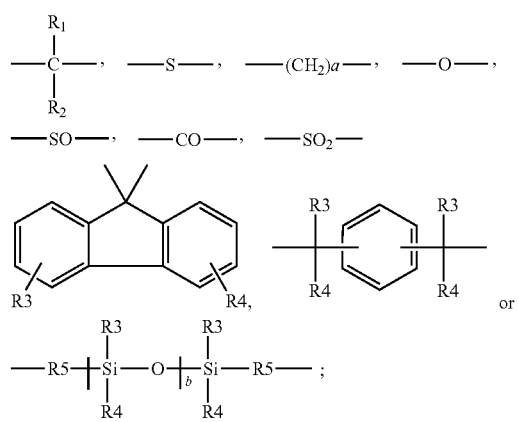

and $R_1$ and $R_2$ each represent hydrogen, fluorine, chlorine, bromine, iodine, an alkyl group having 1 to 9 carbon atoms, an alkoxy group having 1 to 5 carbon atoms, an aryl group having 6 to 12 carbon atoms, an alkenyl group having 2 to 5 carbon atoms, or an aralkyl group having 7 to 17 carbon atoms. $R_1$ and $R_2$ may be bonded to each other to form a carbon ring or a heterocyclic ring.

$R_3$ and $R_4$ each represent hydrogen, fluorine, chlorine, bromine, iodine, an alkyl group having 1 to 9 carbon atoms, an alkoxy group having 1 to 5 carbon atoms, or an aryl group having 6 to 12 carbon atoms. $R_5$ is an alkylene group having 1 to 9 carbon atoms. "a" represents an integer of 0 to 20; and b represents an integer of 1 to 500.

<3> Another preferable embodiment of the present invention is directed to the polycarbonate resin according to <1>, further comprising a structural unit represented by the following formula (3).

(3)

In the formula (3), Y is an alkylene group or a cycloalkylene group having 0 to 20 carbon atoms or a structure represented by the following formula (4).

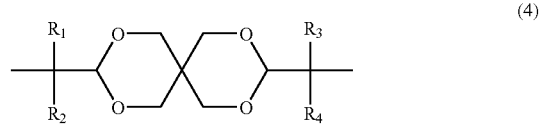

(4)

In the formula (4), $R_1$, $R_2$, $R_3$ and $R_4$ are each a hydrogen atom or an alkyl group having 1 to 5 carbon atoms.

<4> Still another preferable embodiment of the present invention is directed to the polycarbonate resin according to <3>, wherein the structural unit represented by the formula (1) occupies 5 to 90 mol % of the total structural units.
<5> Still another preferable embodiment of the present invention is directed to the polycarbonate resin according to <3> or <4>, wherein the structural unit represented by the formula (3) is a residue of tricyclo[5.2.1.0$^{2,6}$]decanedimethanol, 1,4-cyclohexanedimethanol, or 3,9-bis(2-hydroxy-1,1-dimethylethyl)-2,4,8,10-tetraoxaspiro(5.5)undecane.
<6> Still another preferable embodiment of the present invention is directed to the polycarbonate resin according to <1> or <2>, which has a glass transition temperature of 150° C. or higher, a photo-elastic coefficient of $50 \times 10^{-12}$ m$^2$/N or lower, and a strength of 70 MPa or higher in the state of a film having a thickness of 100 μm.
<7> Still another preferable embodiment of the present invention is directed to the polycarbonate resin according to <3> or <4>, which has a photo-elastic coefficient of $50 \times 10^{-12}$ m$^2$/N or lower, a glass transition temperature of 100° C. or higher and 180° C. or lower, and a refractive index nD of 1.57 or higher.
<8> Another embodiment of the present invention is directed to an optical material, comprising the polycarbonate resin according to any one of <1> through <7>.
<9> Still another embodiment of the present invention is directed to an optical lens, comprising the polycarbonate resin according to any one of <1> through <7>.
<10> Still another embodiment of the present invention is directed to an optical film, comprising the polycarbonate resin according to any one of <1> through <7>.
<11> Still another embodiment of the present invention is directed to a method for producing the polycarbonate resin according to <2>, comprising reacting a dihydroxy compound represented by the following formula (5) and a dihydroxy compound represented by the following formula (6) with a carbonic acid ester-forming compound in the presence of a polymerization catalyst.

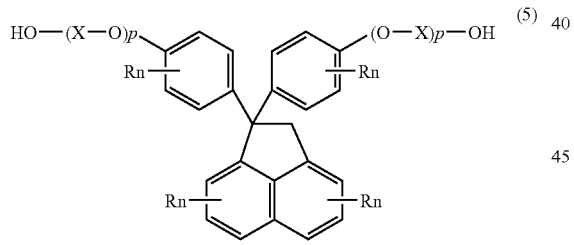

(5)

In the formula (5), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; and n represents the number of substituting R's on a benzene ring and is an integer of 0 to 4. X represents an alkylene group having 1 to 4 carbon atoms; and p is an integer of 0 to 4.

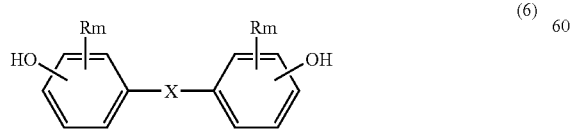

(6)

In the formula (6), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; and m represents the number of substituting R's on a benzene ring and is an integer of 0 to 4. X is

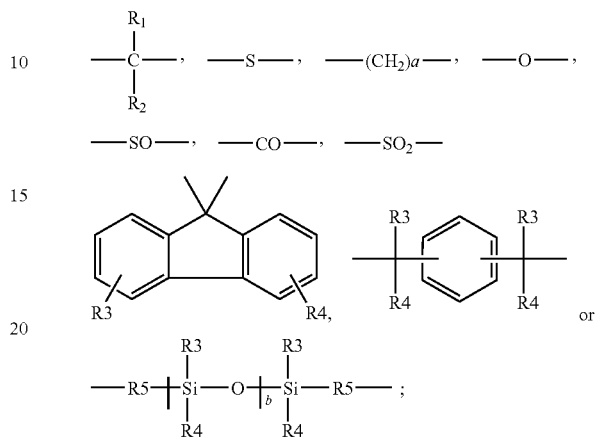

and R$_1$ and R$_2$ each represent hydrogen, fluorine, chlorine, bromine, iodine, an alkyl group having 1 to 9 carbon atoms, an alkoxy group having 1 to 5 carbon atoms, an aryl group having 6 to 12 carbon atoms, an alkenyl group having 2 to 5 carbon atoms, or an aralkyl group having 7 to 17 carbon atoms. R$_1$ and R$_2$ may be bonded to each other to form a carbon ring or a heterocyclic ring.

R$_3$ and R$_4$ each represent hydrogen, fluorine, chlorine, bromine, iodine, an alkyl group having 1 to 9 carbon atoms, an alkoxy group having 1 to 5 carbon atoms, or an aryl group having 6 to 12 carbon atoms. R$_5$ is an alkylene group having 1 to 9 carbon atoms. "a" represents an integer of 0 to 20; and b represents an integer of 1 to 500.

<12> Still another embodiment of the present invention is directed to a method for producing the polycarbonate resin according to <3>, comprising reacting a dihydroxy compound represented by the following formula (5) and a dihydroxy compound represented by the following formula (7) with carbonic acid diester in the presence of a polymerization catalyst.

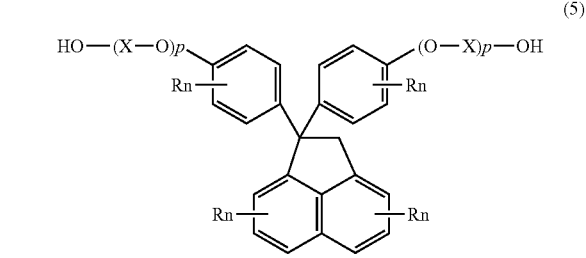

(5)

In the formula (5), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; and n represents the number of substituting R's on a benzene ring and is an integer of 0 to 4. X represents an alkylene group having 1 to 4 carbon atoms; and p is an integer of 0 to 4.

[Formula 7]

$$HOCH_2—Y—CH_2OH \quad (7)$$

In the formula (7), Y is an alkylene group or a cycloalkylene group having 0 to 20 carbon atoms or a structure represented by the following formula (4).

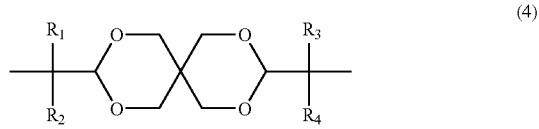

(4)

In the formula (4), $R_1$, $R_2$, $R_3$ and $R_4$ are each a hydrogen atom or an alkyl group having 1 to 5 carbon atoms.

By using a polycarbonate resin according to a preferable embodiment of the present invention, plastic optical products including various types of optical lenses, prisms, optical disc substrates, optical fibers, and the like, and also optical films which have transparency, heat resistance, high refractive index, low photo-elastic coefficient, and small birefringence can be produced.

BEST MODE FOR CARRYING OUT THE INVENTION

Hereinafter, a polycarbonate resin and a method for producing the same according to the present invention will be described specifically.

1. Polycarbonate Resin

A polycarbonate resin according to the present invention contains a structural unit represented by the following formula (1).

A polycarbonate resin containing a structural unit represented by the following formula (2) in addition to the structural unit represented by the following general formula (1) is also preferable.

In a copolymer containing the structural unit represented by the formula (1) (hereinafter, also referred to as "structural unit (1))" and the structural unit represented by the formula (2) (hereinafter, also referred to as "structural unit (2)), the ratio (mol %) of the structural unit (1), i.e., [structural unit (1)/(structural unit (1)+structural unit (2)], is preferably 5 mol % or higher. The reason for this is that when the ratio of the structural unit (1) is 5 mol % or higher, the heat resistance is improved. In the case of this copolymer, the ratio of the structural unit (1) is especially preferably 10 to 85 mol % because with such a ratio, the balance of the optical properties and the moldability is good.

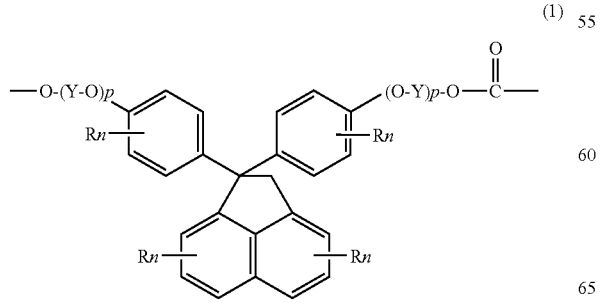

(1)

In the formula (1), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; and n represents the number of substituting R's on a benzene ring and is an integer of 0 to 4. Y represents an alkylene group having 1 to 4 carbon atoms; and p is an integer of 0 to 4.

In the formula (1), R preferably represents one selected from an alkyl group having 1 to 4 carbon atoms, an aryl group having 6 to 12 carbon atoms, an alkenyl group having 2 to 4 carbon atoms, an alkoxy group having 1 to 3 carbon atoms, an aralkyl group having 7 to 13 carbon atoms, and halogen. More preferably, R is methyl, cyclohexyl, or phenyl.

n is preferably an integer of 0 to 1. Preferably, Y is an alkylene group having 1 to 2 carbon atoms; and p is an integer of 0 to 1.

Specific examples of such a structural unit (1) include residues of 1,1-bis(4-hydroxyphenyl)acenaphthene, 1,1-bis(4-cresol)acenaphthene, 1,1-bis(phenoxyethanol)acenaphthene, and the like. These may be used as a combination of two or more. 1,1-bis(4-hydroxyphenyl)acenaphthene is especially preferable.

Now, the structural unit represented by the formula (2) will be described.

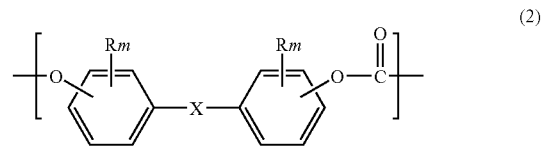

(2)

In the formula (2), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; and m represents the number of substituting R's on a benzene ring and is an integer of 0 to 4. X is

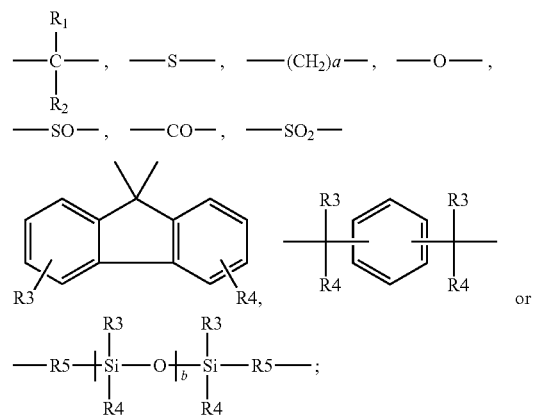

and $R_1$ and $R_2$ each represent hydrogen, fluorine, chlorine, bromine, iodine, an alkyl group having 1 to 9 carbon atoms, an alkoxy group having 1 to 5 carbon atoms, an aryl group having 6 to 12 carbon atoms, an alkenyl group having 2 to 5 carbon atoms, or an aralkyl group having 7 to 17 carbon atoms. $R_1$ and $R_2$ may be bonded to each other to form a carbon ring or a heterocyclic ring.

$R_3$ and $R_4$ each represent hydrogen, fluorine, chlorine, bromine, iodine, an alkyl group having 1 to 9 carbon atoms, an alkoxy group having 1 to 5 carbon atoms, or an aryl group having 6 to 12 carbon atoms. $R_5$ is an alkylene group having 1 to 9 carbon atoms. "a" represents an integer of 0 to 20; and b represents an integer of 1 to 500.

In the formula (2), R preferably represents one selected from an alkyl group having 1 to 4 carbon atoms, an aryl group having 6 to 12 carbon atoms, an alkenyl group having 2 to 4 carbon atoms, an alkoxy group having 1 to 3 carbon atoms, an aralkyl group having 7 to 13 carbon atoms, and halogen. More preferably, R is methyl, cyclohexyl or phenyl. Preferable examples of X include isopyridene group, methylene group, and fluorenonyl group.

In order to have a sufficient strength as a film or a sheet, a polycarbonate resin containing the structural unit (1) or a polycarbonate resin containing the structural units (1) and (2) preferably has an intrinsic viscosity (also referred to as "limiting viscosity") of 0.30 to 2.0 dl/g, and more preferably of 0.40 to 1.5 dl/g. The "intrinsic viscosity" means the ratio of viscosity increase per unit concentration of a polymer, which is found in a diluted solution in which the influence of polymer-to-polymer contact is negligible.

A polycarbonate resin containing the structural unit (1) or a polycarbonate resin containing the structural units (1) and (2) preferably has a glass transition temperature of 120° C. or higher, and more preferably of 120 to 180° C. The reason for this is that when the glass transition temperature is 120 to 180° C., the polycarbonate is easily injection-molded.

A polycarbonate resin containing the structural unit (1) or a polycarbonate resin containing the structural units (1) and (2) preferably has a photo-elastic coefficient of $50 \times 10^{-12}$ $m^2/N$ or lower, and more preferably of $30 \times 10^{-12}$ $m^2/N$ or lower. The reason for this is that when the photo-elastic coefficient is $50 \times 10^{-12}$ $m^2/N$ or lower, birefringence is unlikely to occur.

A polycarbonate resin containing the structural unit (1) or a polycarbonate resin containing the structural units (1) and (2) preferably has a strength of 70 MPa or higher, and more preferably of 80 to 100 MPa, in the state of a film having a thickness of 100 μm. The reason for this is that when the strength is 70 MPa or higher, a strong film is realized.

A polycarbonate resin containing the structural unit (1) preferably has an average molecular weight (Mw) of 25000 to 55000, and more preferably of 30000 to 45000. A polycarbonate resin containing the structural units (1) and (2) preferably has an average molecular weight (Mw) of 25000 to 55000, and more preferably of 30000 to 45000.

A carbonate unit other than the structural unit (1) or the structural unit (2) may be contained in such a range that the effects of the present invention are not spoiled.

As a polycarbonate resin according to the present invention, a copolymer containing a structural unit represented by the following formula (3) (hereinafter, also referred to as "structural unit (3)") in addition to the structural unit represented by the above formula (1) is also preferable.

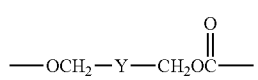

(3)

In the formula, Y is an alkylene group or a cycloalkylene group having 0 to 20 carbon atoms or a structure represented by the following formula (4).

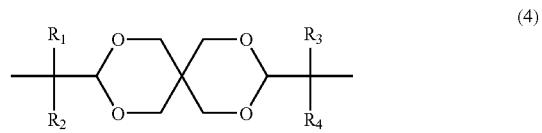

(4)

In the formula (4), $R_1$, $R_2$, $R_3$ and $R_4$ are each a hydrogen atom or an alkyl group having 1 to 5 carbon atoms.

Specific examples of such a structural unit (3) include residues of straight chain diols such as ethyleneglycol, 1,3-propanediol, 1,4-butanediol, 1,5-pentanediol, 1,4-cyclohexanedimethanol, 1,6-hexanediol, and the like; and residues of cyclic diols such as tricyclo[5.2.1.0$^{2,6}$]decanedimethanol, 4,10-dimethyltricyclo[5.2.1.0$^{2,6}$]decanedimethanol, 4,4,10,10-tetramethyltricyclo[5.2.1.0$^{2,6}$]decanedimethanol, 1,2,3,4,5,6,7,8,9,10-decamethyltricyclo[5.2.1.0$^{2,6}$]decanedimethanol, 3,9-bis(2-hydroxyethyl)-2,4,8,10-tetraoxospiro(5.5)undecane, 3,9-bis(2-hydroxy-1,1-diethylethyl)-2,4,8,10-tetraoxaspiro(5.5)undecane, 3,9-bis(2-hydroxy-1,1-dipropylethyl)-2,4,8,10-tetraoxaspiro(5.5)undecane 1,4-cyclohexanediol (trans, cis or a mixture thereof), and the like. These dihydroxy compounds may be used independently or as a combination of two or more.

Among these, a residue of a dihydroxy compound selected from tricyclo[5.2.1.0$^{2,6}$]decanedimethanol, 1,4-cyclohexanedimethanol, and 3,9-bis(2-hydroxy-1,1-dimethylethyl)-2,4,8,10-tetraoxaspiro(5.5)undecane is preferable.

A polycarbonate resin containing the structural units (1) and (3) is a copolymer in which the structural unit represented by the above formula (1) and the structural unit represented by the formula (3) are bonded to each other randomly, in a block-to-block manner, or alternately, and has an average molecular weight (Mw) of 20000 to 200000, preferably of 30000 to 100000.

A carbonate unit other than the structural unit (1) or the structural unit (3) may be contained in such a range that the effects of the present invention are not spoiled.

In a copolymer containing the structural unit represented by the formula (1) ("structural unit (1)") and the structural unit represented by the formula (3) ("structural unit (3)), the ratio (mol %) of the structural unit (1), i.e., [structural unit (1)/(structural unit (1)+structural unit (3)], is preferably 5 to 90 mol %. The reason for this is that when the ratio of the structural unit (1) is 5 mol % or higher, the heat resistance is improved. The ratio of the structural unit (1) is especially preferably 10 to 85 mol % because with such a ratio, the balance of the optical properties and the moldability is good.

A polycarbonate resin containing the structural units (1) and (3) can be molded by a known method such as wet molding, extrusion molding, compression molding, inflation molding, injection molding or the like. Especially in order to have a sufficient strength after being molded by injection molding, the polycarbonate resin preferably has an intrinsic viscosity (limiting viscosity) of 0.30 to 2.0 dl/g, and more preferably of 0.40 to 1.5 dl/g. When the intrinsic viscosity is 0.30 dl/g or higher, a sufficient strength is provided. When the intrinsic viscosity is 2.0 dl/g or lower, the melt viscosity is not too high while the fluidity is good, and so the polycarbonate resin is easily molded.

A polycarbonate resin containing the structural units (1) and (3) preferably has a glass transition temperature of 100° C. or higher and 180° C. or lower, and more preferably of 105° C. or higher and 165° C. or lower. When the glass transition temperature is 100° C. or higher, the heat resistance is good and the polycarbonate resin is usable for various uses. A glass transition temperature of 180° C. or lower is preferable because with such a range, the fluidity is good and the polycarbonate resin is easily molded. Restricting the molecular weight to be low for securing the fluidity is not preferable because this makes the polycarbonate resin brittle.

A polycarbonate resin containing the structural units (1) and (3) preferably has a photo-elastic coefficient of $50\times10^{-12}$ m$^2$/N or lower, and more preferably of $30\times10^{-12}$ m$^2$/N or lower. The reason for this is that when the photo-elastic coefficient is $50\times10^{-12}$ m$^2$/N or lower, birefringence is unlikely to occur.

A polycarbonate resin containing the structural units (1) and (3) preferably has a refractive index nD of 1.57 or higher, and more preferably of 1.60 or higher. The reason for this is that when the refractive index nD is 1.57 or higher, a thin lens can be realized.

2. Method for Producing a Polycarbonate Resin

A polycarbonate resin (homopolymer) containing the structural unit (1) is produced by a method including the step of reacting bisphenol (dihydroxy compound) represented by the following formula (5) and a carbonic acid ester-forming compound.

A polycarbonate resin containing the structural units (1) and (2) is produced by a method including the step of reacting bisphenol (dihydroxy compound) represented by the following formula (5) and bisphenol (dihydroxy compound) represented by the following formula (6) with a carbonic acid ester-forming compound.

Specifically, such a polycarbonate resin can be produced by a known method used for producing polycarbonate from bisphenol A and a carbonic acid ester-forming compound, for example, direct reaction of a bisphenol and phosgene (phosgene method), transesterification of a bisphenol and bisarylcarbonate (transesterification method) or the like.

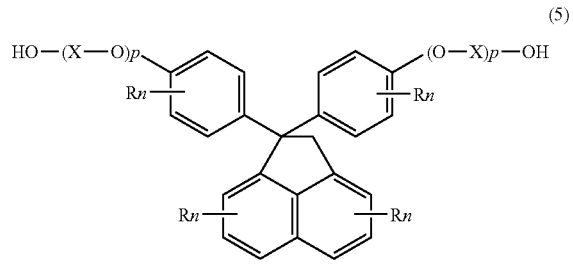

(5)

In the formula (5), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; and n represents the number of substituting R's on a benzene ring and is an integer of 0 to 4. Y represents an alkylene group having 1 to 4 carbon atoms; and p is an integer of 0 to 4.

In the formula (5), R preferably represents one selected from an alkyl group having 1 to 4 carbon atoms, an aryl group having 6 to 12 carbon atoms, an alkenyl group having 2 to 4 carbon atoms, an alkoxy group having 1 to 3 carbon atoms, an aralkyl group having 7 to 13 carbon atoms, and halogen. More preferably, R is methyl, cyclohexyl, or phenyl.

n is preferably an integer of 0 to 1. Preferably, Y is an alkylene group having 1 to 2 carbon atoms, and p is an integer of 0 to 1.

Examples of the bisphenol represented by the above formula (5) include residues of 1,1-bis(4-hydroxyphenyl) acenaphthene, 1,1-bis(4-cresol)acenaphthene, 1,1-bis(phenoxyethanol)acenaphthene, and the like. These may be used as a combination of two or more. 1,1-bis(4-hydroxyphenyl) acenaphthene is especially preferable.

Now, the hydroxyl compound represented by the formula (6) will be described.

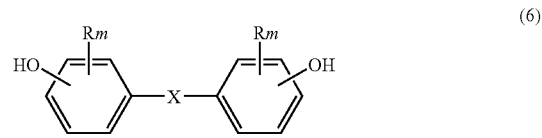

(6)

In the formula (6), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; and m represents the number of substituting R's on a benzene ring and is an integer of 0 to 4. X is

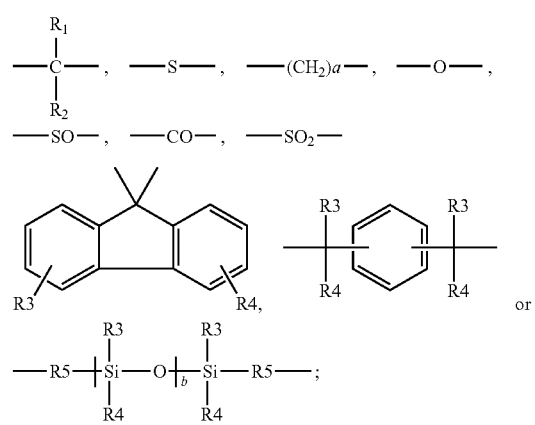

and $R_1$ and $R_2$ each represent hydrogen, fluorine, chlorine, bromine, iodine, an alkyl group having 1 to 9 carbon atoms, an alkoxy group having 1 to 5 carbon atoms, an aryl group having 6 to 12 carbon atoms, an alkenyl group having 2 to 5 carbon atoms, or an aralkyl group having 7 to 17 carbon atoms. $R_1$ and $R_2$ may be bonded to each other to form a carbon ring or a heterocyclic ring.

$R_3$ and $R_4$ each represent hydrogen, fluorine, chlorine, bromine, iodine, an alkyl group having 1 to 9 carbon atoms, an alkoxy group having 1 to 5 carbon atoms, or an aryl group having 6 to 12 carbon atoms. $R_5$ is an alkylene group having 1 to 9 carbon atoms. "a" represents an integer of 0 to 20; and b represents an integer of 1 to 500.

In the formula (6), R preferably represents one selected from an alkyl group having 1 to 4 carbon atoms, an aryl group having 6 to 12 carbon atoms, an alkenyl group having 2 to 4 carbon atoms, an alkoxy group having 1 to 3 carbon atoms, an aralkyl group having 7 to 13 carbon atoms, and halogen. More preferably, R is methyl, cyclohexyl, or phenyl.

There are various bisphenols represented by the above formula (6). Examples thereof include 1,1'-biphenyl-4,4'-diol, bis(4-hydroxyphenyl)methane, 1,1-bis(4-hydroxyphenyl)ethane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxyphenyl)propane, 2,2-bis(4-hydroxy-3-t- butylphenyl)propane, 2,2-bis(4-hydroxy-3-methylphenyl) propane, 1,1-bis(4-hydroxyphenyl)cyclopentane, 1,1-bis(4-hydroxyphenyl)cyclohexane, 2,2-bis(4-hydroxyphenyl)hexafluoropropane, bis(4-hydroxyphenyl)diphenylmethane, 1,1-bis(4-hydroxyphenyl)-1-phenylethane, 9,9-bis(4-hydroxyphenyl)fluorene, 9,9-bis(4-hydroxy-3-methylphenyl) fluorene, α,ω-bis[2-(p-hydroxyphenyl)ethyl]polydimethylsiloxane, α,ω-bis[3-(o-hydroxyphenyl)propyl] polydimethylsiloxane, 4,4'-[1,3-phenylenebis(1-methylethylidene)]bisphenol, 1,1-bis(4-hydroxyphenyl)-1-phenylethane, and the like. These may be used as a combination of two or more. Among these, a bisphenol selected from 2,2-bis(4-hydroxyphenyl)propane (bisphenol A: BPA), 2,2-bis(4-hydroxy-3-methylphenyl)propane (bisphenol C: BPC), bis(4-hydroxyphenyl)ether, 1,1-bis(4-hydroxyphenyl)cyclohexane (bisphenol Z: BPZ), and 1,1-bis(4-hydroxyphenyl)-1-phenylethane (bisphenol AP: BPAP) is especially preferable, and BPA or BPZ is more preferable.

Examples of the carbonic acid ester-forming compound include phosgene; and bisallylcarbonates such as diphenylcarbonate, di-p-tolylcarbonate, phenyl-p-tolylcarbonate, di-p-chlorophenylcarbonate, dinaphtylcarbonate, and the like. These compounds may be used as a combination of two or more.

Usually according to the phosgene method, a bisphenol represented by the formula (5) is reacted with phosgene, or a bisphenol represented by the formula (5) and a bisphenol represented by the formula (6) are reacted with phosgene, in the presence of an acid binder and a solvent. Materials usable as the acid binder include, for example, pyridine; and a hydroxide of an alkaline metal such as sodium hydroxide, potassium hydroxide and the like. Materials usable as the solvent include, for example, methylene chloride, chloroform and the like. In order to promote the polycondensation reaction, it is preferable to add a catalyst such as a tertiary amine (e.g., triethylamine), a quaternary ammonium salt or the like. In order adjust the polymerization degree, it is preferable to add, as a molecular weight adjuster, a monofunctional compound such as phenol, p-t-butylphenol, p-cumylphenol, long-chain alkyl-substituted phenol, olefin-substituted phenol or the like. As desired, an antioxidant such as sodium sulfite, hydrosulfite or the like; or a branching agent such as phloroglucine, isatin bisphenol or the like may be added in a small amount. It is generally appropriate to cause a reaction at a temperature in the range of 0 to 150° C., preferably in the range of 5 to 40° C. The reaction time depends on the reaction temperature, and is usually 0.5 minutes to 10 hours, preferably 1 minute to 2 hours. During the reaction, it is preferable to keep the pH of the reaction system to 10 or higher.

According to the transesterification method, a bisphenol represented by the formula (5) is mixed with bisarylcarbonate, or a bisphenol represented by the formula (5) and a bisphenol represented by the formula (6) are mixed with bisarylcarbonate, and a reaction is caused at a reduced pressure and a high temperature. The reaction is usually caused at a temperature in the range of 150 to 350° C., preferably in the range of 200 to 300° C. It is preferable to reduce the pressure to a final level of 1 mmHg or lower to distil away the phenol derived from the bisarylcarbonate generated by the transesterification reaction to the outside of the system. The reaction time depends on the reaction temperature, the degree of pressure reduction or the like, and is usually about 1 to 4 hours. It is preferable to cause the reaction in an inert gas atmosphere of nitrogen, argon or the like. As desired, the reaction may be caused with a molecular weight adjuster, an antioxidant or a branching agent being added. These additives will be described later.

A film or a sheet may be produced by any method, and a solution cast method is especially preferable. As a solvent for the solution cast method, any of various solvents capable of dissolving the polycarbonate copolymer is usable. Methylene chloride, tetrahydrofran, dioxane and the like are preferable.

A polycarbonate resin containing the structural units (1) and (3) is produced by a method including the step of reacting a dihydroxy compound represented by the following formula (5) and a dihydroxy compound represented by the following formula (7) with a carbonic acid ester-forming compound in the presence of a polymerization catalyst.

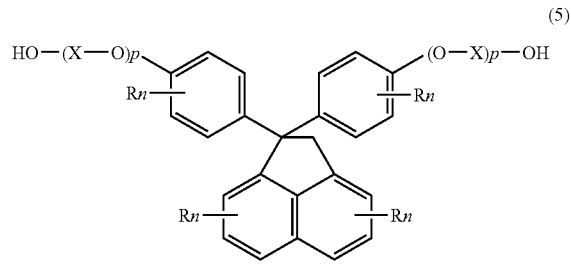

(5)

The formula (5) is as described above.

Now, the dihydroxy compound represented by the formula (7) will be described.

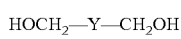

Formula (7)

$$HOCH_2—Y—CH_2OH \quad (7)$$

In the formula, Y is an alkylene group or a cycloalkylene group having 0 to 20 carbon atoms or a structure represented by the following formula (4):

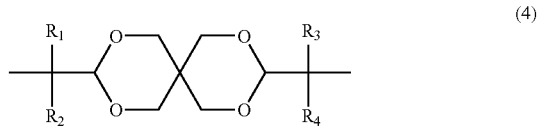

(4)

In the formula (4), $R_1$, $R_2$, $R_3$ and $R_4$ are each a hydrogen atom or a primary alkyl group having 1 to 5 carbon atoms.

Specific examples of the dihydroxy compound represented by the formula (7) include straight chain diols such as ethyleneglycol, 1,3-propanediol, 1,4-butanediol, 1,5-pentanediol, 1,4-cyclohexanedimethanol, 1,6-hexanediol, and the like; and cyclic dihydroxy compounds such as tricyclo[5.2.1.0$^{2,6}$] decanedimethanol, 4,10-dimethyltricyclo[5.2.1.0$^{2,6}$]decanedimethanol, 4,4,10,10-tetramethyltricyclo[5.2.1.0$^{2,6}$] decanedimethanol, 1,2,3,4,5,6,7,8,9,10-decanemethyltricyclo[5.2.1.0$^{2,6}$]decanedimethanol, 3,9-bis (2-hydroxyethyl)-2,4,8,10-tetraoxospiro(5.5)undecane, 3,9-bis(2-hydroxy-1,1-diethylethyl)-2,4,8,10-tetraoxaspiro(5.5) undecane, 3,9-bis(2-hydroxy-1,1-dipropylethyl)-2,4,8,10-tetraoxaspiro(5.5)undecane 1,4-cyclohexanediol (trans, cis, or a mixture thereof), and the like. These dihydroxy compounds may be used as a combination of two or more.

Among these, a residue of a dihydroxy compound selected from tricyclo[5.2.1.0$^{2,6}$]decanedimethanol, 1,4-cyclohexanedimethanol, and 3,9-bis(2-hydroxy-1,1-dimethylethyl)-2, 4,8,10-tetraoxaspiro(5.5)undecane is preferable.

Examples of the carbonic acid ester-forming compound include phosgene; and bisallylcarbonates such as diphenylcarbonate, di-p-tolylcarbonate, phenyl-p-tolylcarbonate, dip-chlorophenylcarbonate, dinaphtylcarbonate, and the like. These compounds may be used as a combination of two or more.

According to the transesterification method, a dihydroxy compound represented by the formula (5) and a dihydroxy compound represented by the formula (7) are mixed with bisarylcarbonate, and a reaction is caused at a reduced pressure and a high temperature. The reaction is usually caused at a temperature in the range of 150 to 350° C., preferably in the range of 200 to 300° C. It is preferable to reduce the pressure to a final level of 1 mmHg or lower to distil away the phenol derived from the bisarylcarbonate generated by the transesterification reaction to the outside of the system. The reaction time depends on the reaction temperature, the degree of pressure reduction or the like, and is usually about 1 to 4 hours. It is preferable to cause the reaction in an inert gas atmosphere of nitrogen, argon or the like. As desired, the reaction may be caused with a molecular weight adjuster, an antioxidant or a branching agent being added.

According to the present invention, it is preferable to add any of various known additives to an aromatic-aliphatic polycarbonate resin copolymer in accordance with the respective purpose in such a range that the properties of each of the above-mentioned specific compounds contained in the copolymer are not spoiled.

Examples of the antioxidant include phosphite compounds such as triphenylphosphite, tris(4-methylphenyl)phosphite, tris(4-t-butylphenyl)phosphite, tris(mononylphenyl)phosphite, tris(2-methyl-4-ethylphenyl)phosphite, tris(2-methyl-4-t-butylphenyl)phosphite, tris(2,4-di-t-butylphenyl)phosphite, tris(2,6-di-t-butylphenyl)phosphite, tris(2,4-di-t-butyl-5-methylphenyl)phosphite, tris(mono, dinonylphenyl)phosphite, bis(mononylphenyl)pentaerythritol-di-phosphite, bis(2,4-di-t-butylphenyl)pentaerythritol-di-phosphite, bis(2,6-di-t-butyl-4-methylphenyl)pentaerythritol-di-phosphite, bis(2,4,6-tri-t-butylphenyentaerythritol-di-phosphite, bis(2,4-di-t-butyl-5-methylphenyl)pentaerythritol-di-phosphite, 2,2-methylenebis(4,6-dimethylphenyl)octylphosphite, 2,2-methylenebis(4-t-butyl-6-methylphenyl)octylphosphite, 2,2-methylenebis(4,6-di-t-butylphenyl)octylphosphite, 2,2-methylenebis(4,6-dimethylphenyl)hexylphosphite, 2,2-methylenebis(4,6-di-t-butylphenyl)hexylphosphite, 2,2-methylenebis(4,6-di-t-butylphenyl) stearylphosphite, and the like; hindered phenol-based compounds such as pentaerythrityl-tetrakis[3-(3,5-di-t-butyl-4-hydroxyphenyl)propionate], 1,6-hexanediol-bis[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene, triethyleneglycol-bis[3-(3-t-butyl-5-methyl-4-hydroxyphenyl)propionate], 3,9-bis{2-[3-t-butyl-4-hydroxy-5-methylphenyl)propionyloxy]-1,1-dimethylethyl}-2,4,8,10-tetraoxaspiro[5,5]undecane, 1,1,3-tris[2-methyl-4-(3,5-di-t-butyl-4-hydroxyphenylpropionyloxy)-5-t-butylphenyl]butane, and the like; 5,7-di-t-butyl-3-(3,4-dimethylphenyl)-3H-benzofran-2-one; and the like. These may be used independently or as a combination of two or more.

The amount of such an antioxidant is, with respect to 100% by weight of the aromatic-aliphatic polycarbonate resin copolymer, 0.005 to 0.1% by weight, preferably 0.01 to 0.08% by weight, and more preferably 0.01 to 0.05% by weight. When the amount is lower than this, a desired effect is not obtained; whereas an amount higher than this is not appropriate because the heat resistance properties and the mechanical properties are deteriorated.

Examples of an ultraviolet absorber include 2-(5-methyl-2-hydroxyphenyl)benzotriazole, 2-[2-hydroxy-3,5-bis($\alpha,\alpha$-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)benzotriazole, 2,2'-methylenebis[4-(1,1,3,3-tetramethylbutyl)-6-[(2H-benzotriazole-2-yl)phenol]], 2-(4,6-diphenyl-1,3,5-triazine-2-yl)-5-[(hexyl)oxy]-phenol, 2,4-dihydroxobenzophenone, 2-hydroxy-4-n-octyloxybenzophenone, 2-hydroxy-4-methoxy-2'-carboxybenzophenone, and the like. These may be used independently or as a combination of two or more.

As a releasing agent, anything generally used is usable. Examples of the releasing agent include fatty acid esters such as natural or synthetic paraffin, silicone oil, polyethylene wax, beeswax, stearic acid, monoglyceride stearate, stearyl stearate, monoglyceride palmitate, behenin behenate, monoglyceride laurate, pentaerythritoldistearate, pentaerythritoltetrastearate, and the like. These may be used independently or as a combination of two or more.

Frame retarder, antistatic agent, pigment, dye, polymer modifier, lubricant, plasticizer or the like may be used independently or as a combination of two or more when necessary.

The present invention also provides an optical material using the above-described polycarbonate resin according to the present invention.

Examples of the optical materials include plastic optical products such as various types of optical lenses, prisms, optical disc substrates, optical fibers, optical communication devices; optical films; and the like. When used for any of the above-mentioned uses, a polycarbonate resin according to the present invention may be used as a PC resin composition containing a known antioxidant, ultraviolet absorber, photostabilizer, colorant such as fluorescent colorant, photochromic colorant or the like, refractive index adjuster, inorganic particulate or the like.

EXAMPLES

Hereinafter, present invention will be described more specifically by way of examples. The present invention is not limited to any of these examples. The measured values in the examples were each obtained by the following method or device.

1) Intrinsic viscosity (limiting viscosity): Ubbelohde viscosimeter was used. Measured at 20° C., with 0.5% dichloromethane solution, and at Huggins constant of 0.45.

2) Glass transition temperature (Tg): Measured by a differential scanning calorimeter (DSC).

3) Photo-elastic coefficient: A cast film having a thickness of 100 μm was irradiated with laser light having a wavelength of 633 nm, and the birefringence with respect to the load change was measured by an ellipsometer. The photo-elastic coefficient was calculated from the measured value of the birefringence.

4) Film strength and elongation: The tensile strength and the tensile elongation of a film having a thickness of 100 μm obtained in the examples were measured by Shimadzu Autograph AGS-100G produced by Shimadzu Corporation in conformity to ASTM D882-61T.

5) Total transmittance: Measured by MODEL 1001DP produced by Nippon Denshoku Industries Co., Ltd.

6) Refractive index: Polycarbonate was press-molded into a rectangular parallelepiped of 3 mm (thickness)×8 mm×8 mm, and the refractive index was measured by a refractometer produced by ATAGO Co., Ltd.

7) Birefringence: Measured by an ellipsometer produced by JASCO Corporation.

Synthesis Example 1

To a three necked flask of 10 L, 308 g of acenaphthene, 3250 mL of acetic acid, 30.6 g of cobalt (II) bromide hexahydrate, 6.1 g of cobalt (II) acetate tetrahydrate, and 1.5 g of manganese (II) acetate tetrahydrate were put. These components were stirred and mixed to be dissolved totally. Then, air was blown into the liquid at a rate of 400 L/h at 20° C. and room pressure. After 4.3 hours, the reaction was stopped, and the generated reaction solution was analyzed by gas chromatography. As a result, it was found that the acenaphthene inversion rate was 99.2% and the acenaphthene-1-one yield was 28.1%.

Synthesis Example 2

With respect to 1 kg of the reaction solution generated in synthesis example 1, 1 L of toluene and 2 L of water were added. These components were stirred for 5 minutes and extraction was conducted. Then, the resultant substance was kept still for 15 to 20 minutes to be separated, and the upper toluene layer was recovered. The above-extracted solution and the same amount of 4% aqueous solution of sodium hydroxide were put into a separatory funnel, shaken and kept still. Then, the lower black liquid was removed. The remaining liquid was washed with water of the same amount as that of the remaining liquid. Then, the lower layer was removed. Water was added, 2 mL of hydrochloric acid was added, and these components were shaken. The lower layer was removed, and the remaining substance was washed with water again. The oil layer was washed with an alkaline substance and concentrated to remove the solvent. The concentrate was distilled at a pressure of 1 to 2 mmHg. As a result, 16 g of acenaphthene-1-one was obtained at a distillation temperature of 120° C.

Synthesis example 3

To a three necked flask of 500 mL, 10 g of acenaphthene-1-one obtained in synthesis example 2, 195 g of phenol, 0.8 g of 98% sulfuric acid, and 0.6 g of mercaptoacetic acid were put. These components were stirred at 50° C. for 30 hours in a nitrogen atmosphere. The generated solution after being cooled down to room temperature, 200 mL of toluene, and 60 mL of 2% aqueous solution of sodium hydroxide were put into a separatory funnel, shaken and kept still to distil away the water layer. The oil layer was concentrated by a rotary evaporator, and the pressure thereof was reduced to 1 to 2 mmHg to remove phenol at 90° C. 200 g of toluene was added to 20 g of the obtained solid substance. The resultant substance was heated to be dissolved until toluene was circulated, and then left to be cooled down to room temperature. The deposited crystals were recovered by filtration, washed with toluene and then with water, and dried.

It was found by an element analysis that the obtained crystals contained 85.19% of C, 5.36% of H and 9.45% of O (calculated values: C: 85.15%; H: 5.36%; O: 9.46%). It was found by GC-MS analysis that the molecular weight of 1,1-bis(4-hydroxyphenyl)acenaphthene, which was the target substance, was 338. The chemical shift value (δppm, based on TMS) of $^1$H-NMR in the acetone-$d_6$ solvent was 4.09 (s, 2H), 6.72 (q, 4H), 7.05 (q, 4H), 7.18 (d, 1H), 7.36 (d, 1H), 7.51 (q, 2H), 7.68 (q, 2H), 8.22 (s, 2H). It was found by a measurement of FT-IR using the KBr tablet method that the absorption bands specific to the functional groups, bonding and the like were: hydroxyl group (3308 cm$^{-1}$, 1242 cm$^{-1}$), benzene ring (1595 cm$^{-1}$, 1507 cm$^{-1}$, 1432 cm$^{-1}$, 787 cm$^{-1}$), and naphthalene ring (1595 cm$^{-1}$, 1507 cm$^{-1}$, 1432 cm$^{-1}$, 1176 cm$^{-1}$, 787 cm$^{-1}$). It was found by GC analysis that the purity of the obtained crystals (19.2 g) was 96.9%.

Example 1

In 1100 mL of 5 w/w % aqueous solution of sodium hydroxide, 203.0 g (0.6 mols) of 1,1-bis(4-hydroxyphenyl)acenaphthene (hereinafter, referred to simply as "ANBP") obtained in synthesis example 3 and 0.1 g of hydrosulfide were dissolved. To the resultant substance, 500 mL of methylene chloride was added. While these components were being stirred and kept at a temperature of 15° C., 90 g of phosgene was blown thereto over 90 minutes. After phosgene was totally blown, 4.18 g of p-t-butylphenol (hereinafter, referred to simply as "PTBP"; produced by DIC corporation) was added as a molecular weight adjustor. These components were actively stirred to emulsify the reaction solution. After the emulsification, 0.6 mL of triethylamine was added, and these components were stirred at 20 to 25° C. for about 1 hour to realize polymerization.

After the polymerization, the reaction solution was separated into an aqueous phase and an organic phase. The organic phase was neutralized with phosphoric acid, and repeatedly washed with water until the conductivity of the aqueous phase became 10 μS/cm or lower. The obtained polymeric solution was dropped onto warm water kept at 45° C., the solvent was vaporized to be removed, and thus a white powder-like precipitate was obtained. The obtained precipitate was filtrated and dried at 105° C. for 24 hours to obtain a polymeric powder.

The intrinsic viscosity, at 20° C., of a solution of this polymer having methylene as a solvent and having a concentration of 0.5 g/dl was 0.60 dl/g. The obtained polymer was analyzed by infrared absorption spectrum. As a result, absorption by a carbonyl group was recognized at a position in the vicinity of 1770 cm$^{-1}$, and absorption by an ether bond was recognized at a position in the vicinity of 1240 cm$^{-1}$. Thus, it was confirmed that the obtained polymer was a polycarbonate resin containing the structural unit represented by the above formula (1). The structural formula of the obtained resin is as follows.

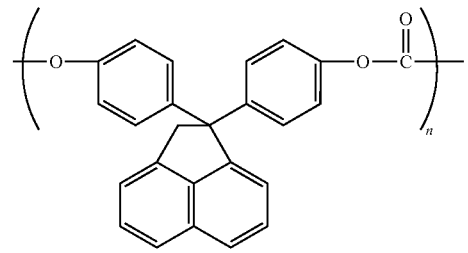

The obtained resin was dissolved in methylene chloride (polymer solution concentration: 20 wt. %) and cast to produce a film.

Example 2

The same procedure as in Embodiment 1 was carried out except that 101.5 g (0.3 mols) of ANBP and 68.4 g (0.3 mols) of 2,2-bis(4-hydroxyphenyl)propane (bisphenol A: BPA) were used. The structural formula of the obtained resin is as follows.

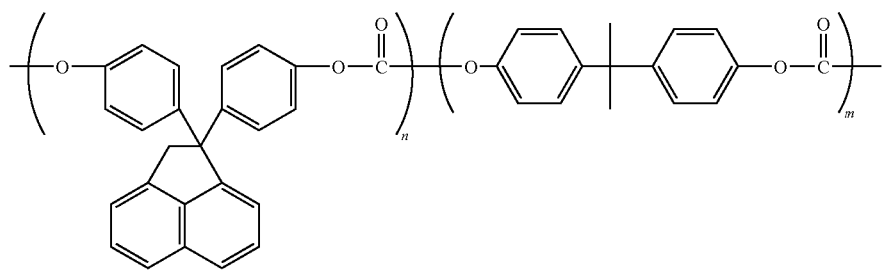

Comparative Example 1

As a polycarbonate resin formed of bisphenol A, Iupilon E-2000 (produced by Mitsubishi Engineering-Plastics Corporation) was used. The structural formula of this resin is as follows.

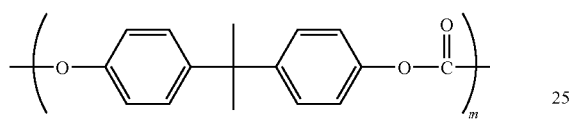

Comparative Example 2

The same procedure as in Embodiment 1 was carried out except that 175.2 g (0.5 mols) of 9,9-bis(4-hydroxyphenyl) fluorene was used. The structural formula of the obtained resin is as follows.

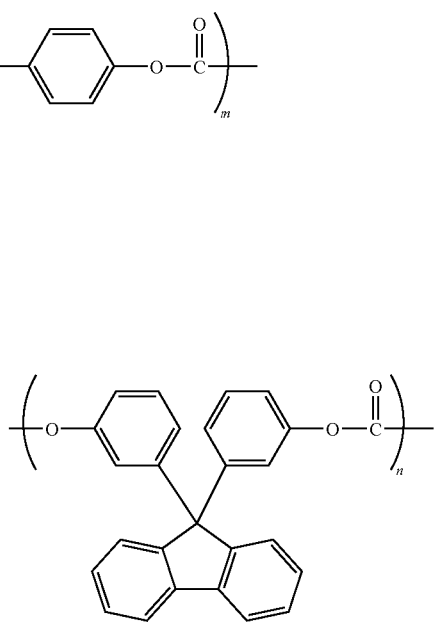

Comparative Example 3

The same procedure as in Embodiment 1 was carried out except that 105.1 g (0.3 mols) of 9,9-bis(4-hydroxyphenyl) fluorene and 68.4 g (0.3 mols) of BPA were used. The structural formula of the obtained resin is as follows.

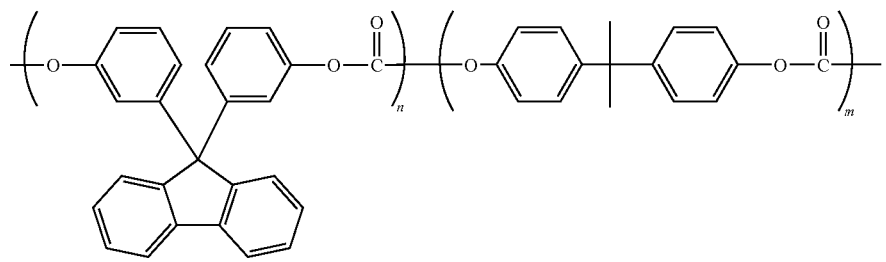

The properties of the resins and films obtained in Examples 1 and 2 and Comparative Examples 1 through 3 were measured. The results are shown in Table 1 below. A polycarbonate resin according to the present invention is a resin containing a monomer having an acenaphthene skeleton. From the results shown in Table 1, it is understood that the present invention can provide a well-balanced polycarbonate resin which has high strength, high transparency and low photoelastic coefficient and thus is suitable to be used for a phase film.

TABLE 1

|  | Ex. 1 | Ex. 2 | Comparative Ex. 1 | Comparative Ex. 2 | Comparative Ex. 3 |
| --- | --- | --- | --- | --- | --- |
| Intrinsic viscosity | 0.60 | 0.62 | 0.65 | 0.39 | 0.55 |
| Tg (° C.) | 209 | 180 | 145 | 245 | 214 |
| Photo-elastic coefficient ($10^{-12}$ m$^2$/N) | 40 | 49 | 83 | 24 | 48 |

TABLE 1-continued

|  | Ex. 1 | Ex. 2 | Comparative Ex. 1 | Comparative Ex. 2 | Comparative Ex. 3 |
|---|---|---|---|---|---|
| Total transmittance (%) | 90 | 91 | 91 | 89 | 89 |
| Tensile strength (MPa) | 70 | 65 | 58 | 15 | 30 |
| Tensile elongation (%) | 10 | 30 | 61 | Ruptured before yield | Ruptured before yield |

Example 3

9.313 kg (25.275 mols) of 1,1-bis(4-hydroxyphenyl)acenaphthene (ANBP) obtained in synthesis example 3, 8.448 kg (43.04 mols) of tricyclo[5.2.1.0$^{2,6}$]decanedimethanol (hereinafter, referred to simply as "TCDDM"), 15.00 kg (70.01 mols) of diphenylcarbonate (hereinafter, referred to simply as "DPC"), and 0.000574 g (6.8 micromols) of sodium hydrogencarbonate were put into a reactor of 50 L equipped with a stirrer and a distillation device, heated to 215° C. over 1 hour in a nitrogen atmosphere of 760 mmHg and stirred.

Then, the pressure was reduced and adjusted to 150 mmHg over 15 minutes. With the conditions of 215° C. and 150 mmHg being kept for 20 minutes, a transesterification reaction was caused. Then, the temperature was raised to 240° C. at a rate of 37.5° C./hr., and the conditions of 240° C. and 150 mmHg were kept for 10 minutes. Then, the pressure was adjusted to 120 mmHg over 10 minutes, and the conditions of 240° C. and 120 mmHg were kept for 70 minutes. Then, the pressure was adjusted to 100 mmHg over 10 minutes, and the conditions of 240° C. and 100 mmHg were kept for 10 minutes. Then, the pressure was reduced to 1 mmHg or lower over 40 minutes, and such conditions were kept for 10 minutes. After the reaction was finished, nitrogen was blown into the reactor to pressurize the inside of the reactor, and the generated polycarbonate was taken out while being pelletized. The intrinsic viscosity of the obtained polycarbonate resin was 0.66, and the Tg thereof was 128° C. The structural formula of the obtained resin is as follows.

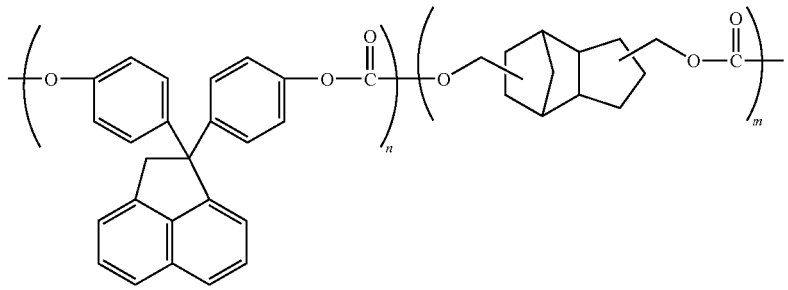

10.0 kg of this polycarbonate resin was dried in vacuum at 100° C. for 24 hours. 500 ppm of ADEKA STAB PEP 36 (trade name; produced by ADEKA Corporation) as an antioxidant, 200 ppm of PH 136 (trade name: produced by Ciba Speciality Chemicals) as an antioxidant, and 300 ppm of glycerin monostearate were added to the resin. These components were kneaded at 250° C. and pelletized by an extruder to obtain a pellet. The intrinsic viscosity of the pellet was 0.64. The pellet was dried in vacuum at 100° C. for 24 hours, and then injection-molded at a cylinder temperature of 250° C. and a die temperature of 120° C. to obtain a double-convex lens having a diameter of 9.4 mm and a radius of curvature of each convex surface of 5.0 mm. The optical properties of the obtained resin lens were measured to find that the refractive index was 1.576, the photo-elastic coefficient was 11×10$^{-12}$ m$^2$/N and the birefringence was 15 nm. It was confirmed that the lens had a very small birefringence and no substantial optical distortion. The total transmittance was measured to be 89%.

Example 4

The same procedure as in Embodiment 1 was carried out except that 8.269 kg (22.44 mols) of ANBP, 7.552 kg (52.36 mols) of cyclohexanedimethanol (mixture of cis and trans), and 16.423 kg (76.68 mols) of DPC were used. The structural formula of the obtained resin is as follows.

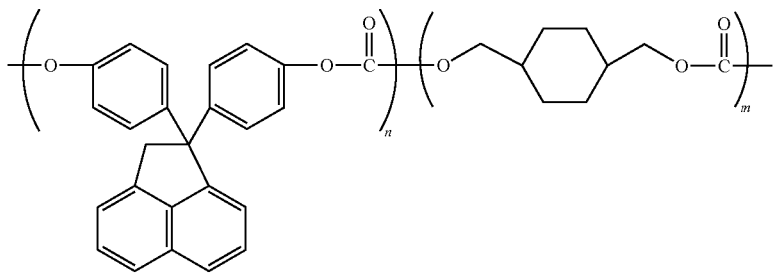

The optical properties of the obtained resin lens were measured to find that the refractive index was 1.585, the photo-elastic coefficient was $17 \times 10^{-12}$ m²/N and the birefringence was 20 nm. It was confirmed that the lens had a very small birefringence and no substantial optical distortion. The total transmittance was measured to be 89%.

Example 5

The same procedure as in Embodiment 1 was carried out except that 14.348 kg (38.94 mols) of ANBP, 8.941 g (29.37 mols) of 2,4,8,10-tetraoxaspiro(5.5)undecane, and 15.00 kg (70.01 mols) of diphenylcarbonate (DPC) were used. The structural formula of the obtained resin is as follows.

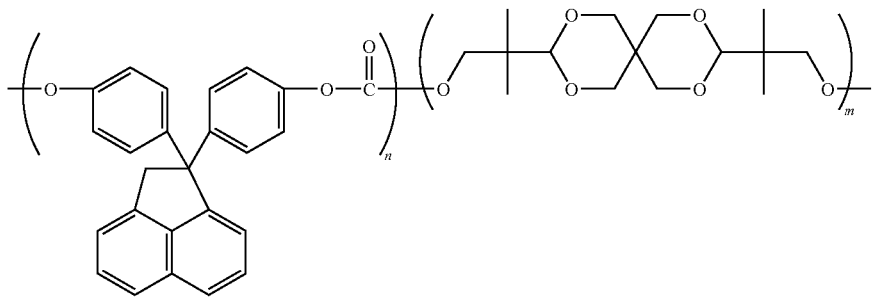

The optical properties of the obtained resin lens were measured to find that the refractive index was 1.575, the photo-elastic coefficient was $25 \times 10^{-12}$ m²/N and the birefringence was 23 nm. It was confirmed that the lens had a very small birefringence and no substantial optical distortion. The total transmittance was measured to be 89%.

Comparative Example 4

As a polycarbonate resin formed of bisphenol A, Iupilon H-4000 (produced by Mitsubishi Engineering-Plastics Corporation) was used. The structural formula of this resin is as follows.

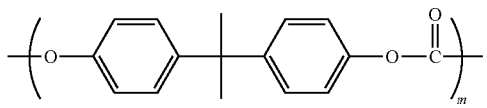

The pellet was dried in vacuum at 100° C. for 24 hours, and then injection-molded at a cylinder temperature of 255° C. and a die temperature of 120° C. to obtain a double-convex lens having a diameter of 9.4 mm and a radius of curvature of each convex surface of 5.0 mm. The optical properties of the obtained resin lens were measured to find that the refractive index was 1.584, the photo-elastic coefficient was $78 \times 10^{-12}$ m²/N and the birefringence was 230 nm. It was confirmed that the lens had a large birefringence and a large optical distortion. The total transmittance was measured to be 89%.

Comparative Example 5

ZEONEX 330R (produced by Zeon Corporation) was used. The structural formula of this resin is as follows.

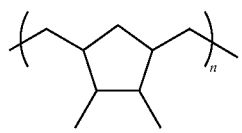

The pellet was dried in vacuum at 100° C. for 24 hours, and then injection-molded at a cylinder temperature of 260° C. and a die temperature of 100° C. to obtain a double-convex lens having a diameter of 9.4 mm and a radius of curvature of each convex surface of 5.0 mm. The optical properties of the obtained resin lens were measured to find that the refractive index was 1.530, the photo-elastic coefficient was $3.2 \times 10^{-12}$ m²/N and the birefringence was 45 nm. The lens had a very small birefringence and no substantial optical distortion, but had a refractive index of as low as 1.53. The total transmittance was measured to be 90%.

The measurement results of properties of the resins and films obtained in Examples 3 through 5 and Comparative Examples 4 and 5 are shown in Table 2 below.

From the results shown in Table 2, it is understood that the present invention can provide a novel polycarbonate resin which has transparency, heat resistance, high refractive index, low photo-elastic coefficient and small birefringence.

TABLE 2

|  |  | Ex. 3 | Ex. 4 | Ex. 5 | Comparative Ex. 4 | Comparative Ex. 5 |
|---|---|---|---|---|---|---|
| Intrinsic viscosity |  | 0.64 | 0.59 | 0.62 | 0.66 | 0.58 |
| Tg | °C. | 128 | 125 | 155 | 145 | 138 |
| Total transmittance | % | 89 | 89 | 89 | 89 | 91 |
| Refractive index |  | 1.576 | 1.585 | 1.575 | 1.584 | 1.530 |
| Photo-elastic coefficient | $10^{-12}\,m^2/N$ | 11 | 17 | 25 | 78 | 3.2 |
| Birefringence | nm | 15 | 20 | 23 | 230 | 45 |

INDUSTRIAL APPLICABILITY

A polycarbonate resin according to the present invention is preferably usable for plastic optical products including various types of lenses, prisms, optical disc substrates, optical fibers, and the like; and for optical films.

The invention claimed is:

1. A polycarbonate resin, comprising a structural unit represented by the following formula (1):

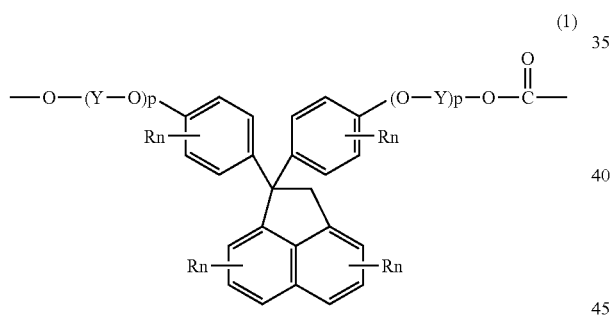

wherein in the formula (1), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; n represents the number of substituting R's on a benzene ring and is an integer of 0 to 4; Y represents an alkylene group having 1 to 4 carbon atoms; and p is an integer of 0 to 4.

2. The polycarbonate resin according to claim 1, further comprising a structural unit represented by the following formula (2):

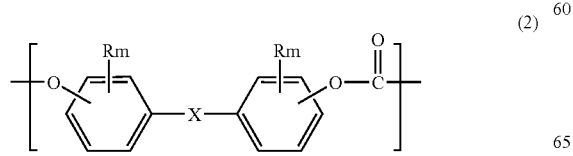

wherein in the formula (2), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; m represents the number of substituting R's on a benzene ring and is an integer of 0 to 4; X is

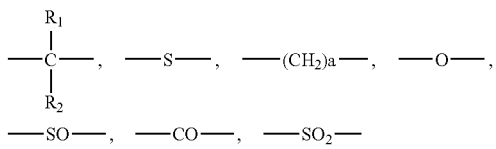

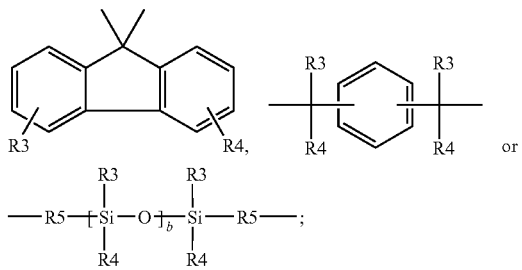

$R_1$ and $R_2$ each represent hydrogen, fluorine, chlorine, bromine, iodine, an alkyl group having 1 to 9 carbon atoms, an alkoxy group having 1 to 5 carbon atoms, an aryl group having 6 to 12 carbon atoms, an alkenyl group having 2 to 5 carbon atoms, or an aralkyl group having 7 to 17 carbon atoms; $R_1$ and $R_2$ may be bonded to each other to form a carbon ring or a heterocyclic ring; and $R_3$ and $R_4$ each represent hydrogen, fluorine, chlorine, bromine, iodine, an alkyl group having 1 to 9 carbon atoms, an alkoxy group having 1 to 5 carbon atoms, or an aryl group having 6 to 12 carbon atoms; $R_5$ is an alkylene group having 1 to 9 carbon atoms; "a" represents an integer of 0 to 20; and b represents an integer of 1 to 500.

3. The polycarbonate resin according to claim 1, further comprising a structural unit represented by the following formula (3):

wherein in the formula (3), Y is an alkylene group or a cycloalkylene group having 0 to 20 carbon atoms or a structure represented by the following formula (4):

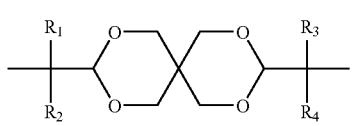

(4)

wherein in the formula (4), $R_1$, $R_2$, $R_3$ and $R_4$ are each a hydrogen atom or an alkyl group having 1 to 5 carbon atoms.

4. The polycarbonate resin according to claim 3, wherein the structural unit represented by the formula (1) occupies 5 to 90 mol % of the total structural units.

5. The polycarbonate resin according to claim 3, wherein the structural unit represented by the formula (3) is a residue of tricyclo[5.2.1.0$^{2,6}$]decanedimethanol, 1,4-cyclohexanedimethanol, or 3,9-bis(2-hydroxy-1,1-dimethylethyl)-2,4,8,10-tetraoxaspiro(5.5)undecane.

6. The polycarbonate resin according to claim 1, which has a glass transition temperature of 150° C. or higher, a photo-elastic coefficient of $50 \times 10^{-12}$ m$^2$/N or lower, and a strength of 70 MPa or higher in the state of a film having a thickness of 100 μm.

7. The polycarbonate resin according to claim 3, which has a photo-elastic coefficient of $50 \times 10^{-12}$ m$^2$/N or lower, a glass transition temperature of 100° C. or higher and 180° C. or lower, and a refractive index nD of 1.57 or higher.

8. An optical material, comprising the polycarbonate resin according to claim 1.

9. An optical lens, comprising the polycarbonate resin according to claims 1.

10. An optical film, comprising the polycarbonate resin according to claim 1.

11. A method for producing the polycarbonate resin according to claim 2, comprising reacting a dihydroxy compound represented by the following formula (5) and a dihydroxy compound represented by the following formula (6) with a carbonic acid ester-forming compound in the presence of a polymerization catalyst:

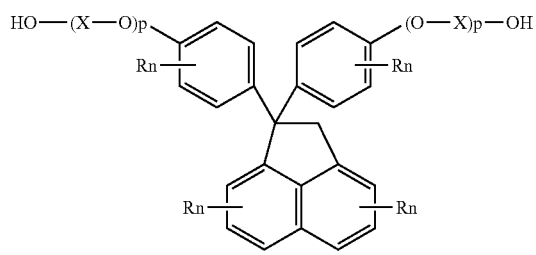

(5)

wherein in the formula (5), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; n represents the number of substituting R's on a benzene ring and is an integer of 0 to 4; X represents an alkylene group having 1 to 4 carbon atoms; and p is an integer of 0 to 4;

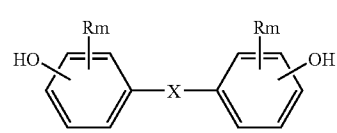

(6)

wherein in the formula (6), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; m represents the number of substituting R's on a benzene ring and is an integer of 0 to 4; X is

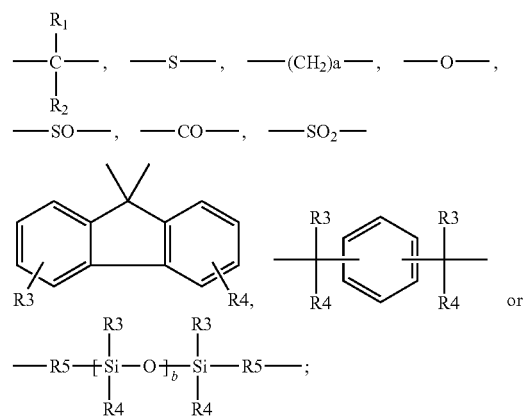

$R_1$ and $R_2$ each represent hydrogen, fluorine, chlorine, bromine, iodine, an alkyl group having 1 to 9 carbon atoms, an alkoxy group having 1 to 5 carbon atoms, an aryl group having 6 to 12 carbon atoms, an alkenyl group having 2 to 5 carbon atoms, or an aralkyl group having 7 to 17 carbon atoms; $R_1$ and $R_2$ may be bonded to each other to form a carbon ring or a heterocyclic ring; and $R_3$ and $R_4$ each represent hydrogen, fluorine, chlorine, bromine, iodine, an alkyl group having 1 to 9 carbon atoms, an alkoxy group having 1 to 5 carbon atoms, or an aryl group having 6 to 12 carbon atoms; $R_5$ is an alkylene group having 1 to 9 carbon atoms; "a" represents an integer of 0 to 20; and b represents an integer of 1 to 500.

12. A method for producing the polycarbonate resin according to claim 3, comprising reacting a dihydroxy compound represented by the following formula (5) and a dihydroxy compound represented by the following formula (7) with carbonic acid diester in the presence of a polymerization catalyst:

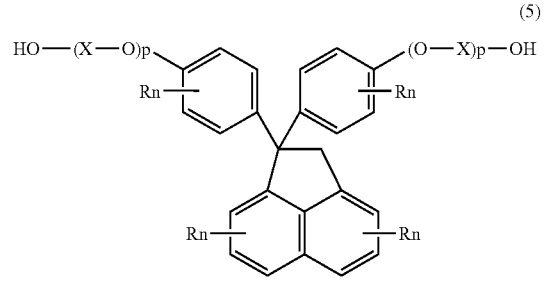

(5)

wherein in the formula (5), R represents one selected from an alkyl group having 1 to 9 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms, and halogen; n represents the number of substituting R's on a benzene ring and is an integer of 0 to 4; X represents an alkylene group having 1 to 4 carbon atoms; and p is an integer of 0 to 4;

(Formula 7)

  (7)

wherein in the formula (7), Y is an alkylene group or a cycloalkylene group having 0 to 20 carbon atoms or a structure represented by the following formula (4):

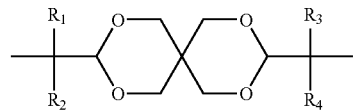  (4)

wherein in the formula (4), $R_1$, $R_2$, $R_3$ and $R_4$ are each a hydrogen atom or an alkyl group having 1 to 5 carbon atoms.

13. The polycarbonate resin according to claim 1, which comprises at least 5 mol % of the structural unit represented by the formula (1).

14. The polycarbonate resin according to claim 2, wherein the structural unit represented by the formula (1) occupies 10 to 85 mol % of the total structural units.

* * * * *